(12) United States Patent  (10) Patent No.: US 6,733,202 B2
Couture et al.                  (45) Date of Patent:     May 11, 2004

(54) QUICK-CONNECT FASTENER

(75) Inventors: Paul Couture, Repentigny (CA); Mihai I. Stamate, Laval (CA)

(73) Assignee: Johnson & Johnson, Inc. (CA)

( * ) Notice: Subject to any disclaimer, the term of this patent is extended or adjusted under 35 U.S.C. 154(b) by 0 days.

(21) Appl. No.: 10/209,130

(22) Filed: Jul. 31, 2002

(65) Prior Publication Data

US 2004/0022578 A1 Feb. 5, 2004

(51) Int. Cl.7 .............................................. A45B 19/00
(52) U.S. Cl. ...................... 403/348; 403/374.1; 403/349
(58) Field of Search ................... 403/345, 348, 403/349, 350, 373, 374.1, 374.2, 374.5

(56) References Cited

U.S. PATENT DOCUMENTS 3,423,781 A * 1/1969 Henson ................. 403/349 X
5,186,197 A * 2/1993 Lavine .................. 403/349 X
6,379,076 B1 * 4/2002 Reinhold et al. ........... 403/348

* cited by examiner

Primary Examiner—John R. Cottingham

(57) ABSTRACT

A quick-connect fastener for removably fastening a component between a first abutment and a moveable shaft. The first abutment is part of a base member and optionally a second abutment may be attached to a shaft. The shaft extends through the base member and is connected to a hand-operated actuator. The quick-connect fastener further includes a locking mechanism that has two mating parts; one mounted to the shaft, and the other mounted to the base member. As a user moves the hand-operated actuator between a locked position and a release position, the first mating part moves both angularly and in a direction along the longitudinal axis of the shaft, in relation to the second mating part. The movement of the two mating parts in relation to each other causes the spacing between the first and second abutments to vary, thereby allowing a component to be fastened and unfastened between the two abutments.

17 Claims, 6 Drawing Sheets

QUICK-CONNECT FASTENER

FIELD OF THE INVENTION

The present invention relates generally to the field of fasteners, and more specifically to quick-connect fasteners that are operable by hand to fasten removable components to machinery.

BACKGROUND OF THE INVENTION

Machinery that is used in production and packaging plants often includes components that can be removed from the machinery. For example, some components may be removable in order to allow a machinery operator to access the interior of the machine for cleaning, or to replace a broken part. In addition, components may be removable so that they can be replaced with different components in order to configure the machinery for a different function. There are many other reasons why certain components could be removable, however, in all cases the removable components rely on fastening devices to secure them in place. Bolts and screws are commonly used as fastening devices since they are able to tightly fasten components to the machinery, and are able to be unscrewed or unbolted when the component needs to be changed, cleaned or repaired.

There are many disadvantages associated with the use of bolts and screws. Firstly, they are very time consuming for the machinery operator to use since each screw, or each bolt, must be untightened and then re-tightened individually. Throughout the time the operator is untightening and re-tightening the bolts or screws, the machinery is not functioning, thereby leading to inefficiency in the production line. Secondly, it is easy to lose bolts and screws since they are relatively small and are completely removable from both the machinery and the changeable component. And finally, the level of force the bolts or screws apply to the removable component is different each time the bolts or screws are fastened, since the force depends on the amount the bolts or screws are tightened by the operator. As such, bolts and screws do not provide any consistency in the level of force applied to the removable component.

As can be seen based on the above description of the prior art, there is a need in the industry for a quick-connect fastener that alleviates, at least in part, the deficiencies associated with the existing methods of fastening.

SUMMARY OF THE INVENTION

As embodied and broadly described herein, the present invention provides a quick-connect fastener for removably fastening a component. The quick-connect fastener has a base member and a shaft having a longitudinal axis that extends through the base member. The shaft and the base member are displaceable with relation to each other between a first position and a second position.

In the first position, the shaft and the base member are positioned relative to each other in order to cause fastening of the component. In the second position the shaft and the base member are positioned relative to each other in order to allow removal of the component.

The quick-connect fastener further includes a locking mechanism with first and second mating parts. One of the mating parts is mounted to the shaft and the other is mounted to the base member. The first mating part is movable both angularly and in a direction along the longitudinal axis of the shaft with relation to the second mating part. The mating parts are movable between a lock position, wherein the shaft and said base member are in the first position, and a release position, wherein the shaft and the base member are in the second position. The locking mechanism is responsive to the movement of the mating parts between the lock position and the release position to cause a relative movement between the shaft and the base member along the longitudinal axis to vary a spacing between the shaft and the base member.

BRIEF DESCRIPTION OF THE DRAWINGS

A detailed description of the specific examples of implementation of the present invention is provided hereinbelow with reference to the following drawings, in which.

Figure 1:
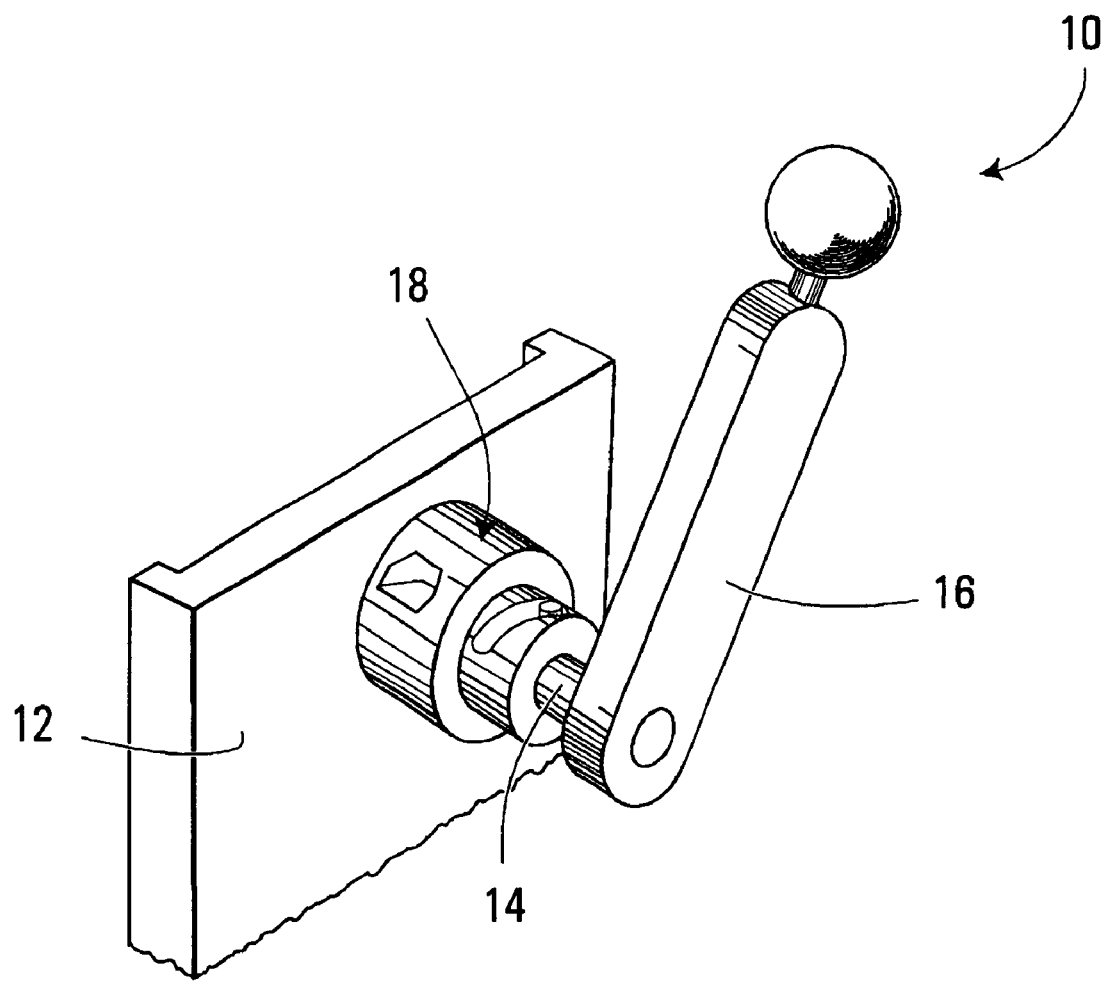
FIG. 1 shows a perspective view of a quick-connect fastener in accordance with a specific example of implementation of the present invention.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

Shown in FIG. 1 is a quick-connect fastener 10 in accordance with a specific example of implementation of the present invention. As can be seen, the quick-connect fastener 10 includes a base member 12, a shaft 14, a hand-operated actuator 16 and a locking mechanism 18.

The construction of the quick-connect fastener 10 will be described below with reference to FIGS. 2a, 2b and 3. In the specific example of implementation shown, the base member 12 is formed as a plate that defines a first abutment 26, which is located on the side of the plate that is farthest away from the hand-operated actuator 16. As will be described further on, the first abutment 26 is adapted to contact a first surface of a component that is to be fastened by the quick-connect fastener 10. The base member 12 may further include a recessed area 13 in the region of the first abutment 26 to act as a guide in order to help align the component with the base member 12. As can be seen in FIG. 3, at the base of the recessed area 13 is a ledge that acts as a stop 15 to further help to align the component in a position to be fastened. It should be understood that the recessed area 13 may be of any shape, size and configuration.

In the specific example of implementation shown, shaft 14 is of a generally cylindrical shape and has a longitudinal axis. As shown in FIGS. 2a and 2b, attached to a first end of shaft 14 is an actuator 16 that is adapted to cause the shaft 14 and base member 12 to move in relation to each other. In the embodiment shown, the actuator 16 is adapted to be hand operated and is shaped as a lever 30 with a ball-shaped grip 32. It should be understood that the actuator 16 may be of any shape, size or configuration that causes shaft 14 and base member 12 to move in relation to each other. As shown in FIG. 3, shaft 14 is keyed to lever 30 via a pin 34.

A second abutment 38 may optionally be attached to the end of shaft 14 opposite the end of shaft 14 that is attached to hand-operated actuator 16. In the specific example of implementation shown, second abutment 38 is formed integrally with shaft 14, however, it is within the scope of the invention for second abutment 38 to be a separate part that is removably attached to shaft 14. As will be described further on, second abutment 38 is adapted to contact a second surface of the component that is to be fastened. As such, the component will be fastened between first abutment 26 and second abutment 38.

Positioned around shaft 14 near second abutment 38 is a resilient element 40. If space is not a concern, other types of resilient elements, such as coil springs around shaft 14, or blocks of rubber could be used. In a preferred embodiment, the resilient element comprises the combination of two bevel washers 41 and a washer 42. The combination of these washers enables the first abutment 26 and the second abutment 38 to fasten the removable component very tightly. The benefit of forming the resilient element 40 out of the combination of two bevel washers 41 and a flat washer 42 is that this combination of washers occupies a very small amount of space. It should be understood that resilient elements of any shape and size can be used without departing from the spirit of the invention.

Resilient element 40 can be positioned in a variety of locations. For example, a quick-connect fastener with a resilient element 40 positioned near the base member 12 is within the scope of the invention, as is a quick-connect fastener with no resilient element at all. Alternatively, the resilient element may not be on the quick-connect fastener at all, but may be carried by the component to be fastened instead. In a preferred embodiment, resilient element 40 is positioned close to the second abutment 38 and is kept in place by a snap ring 44. The snap ring 44 keeps the resilient element 40 close to second abutment 38 so that when shaft 14 is in the release position, as shown in FIG. 2a, there is always a space between first abutment 26 and resilient element 40 that can receive the component to be fastened.

Figure 2A:
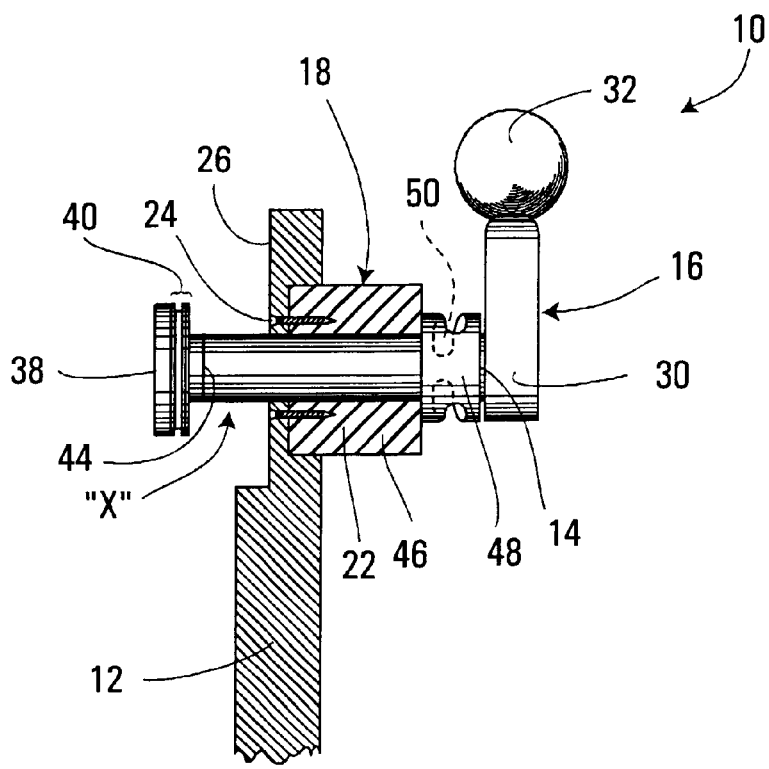
FIG. 2a shows a cross-sectional view of the quick-connect fastener of FIG. 1 in the release position.
Figure 2B:
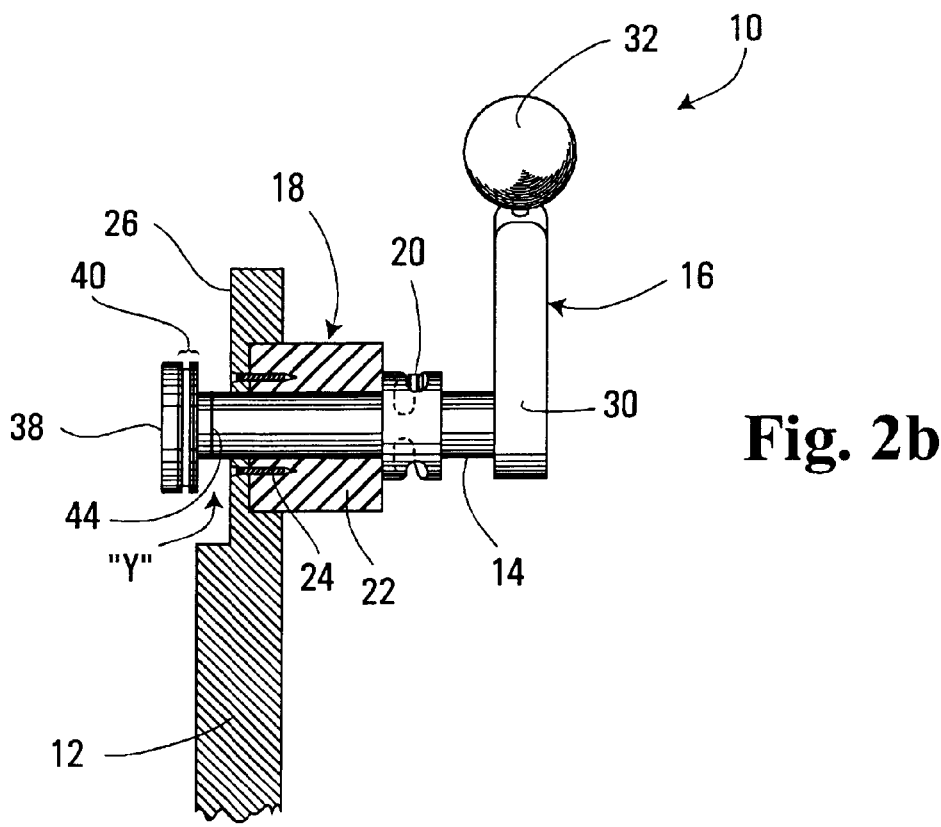
FIG. 2b shows a cross-sectional view of the quick-connect fastener of FIG. 1 in the lock position.
Figure 3:
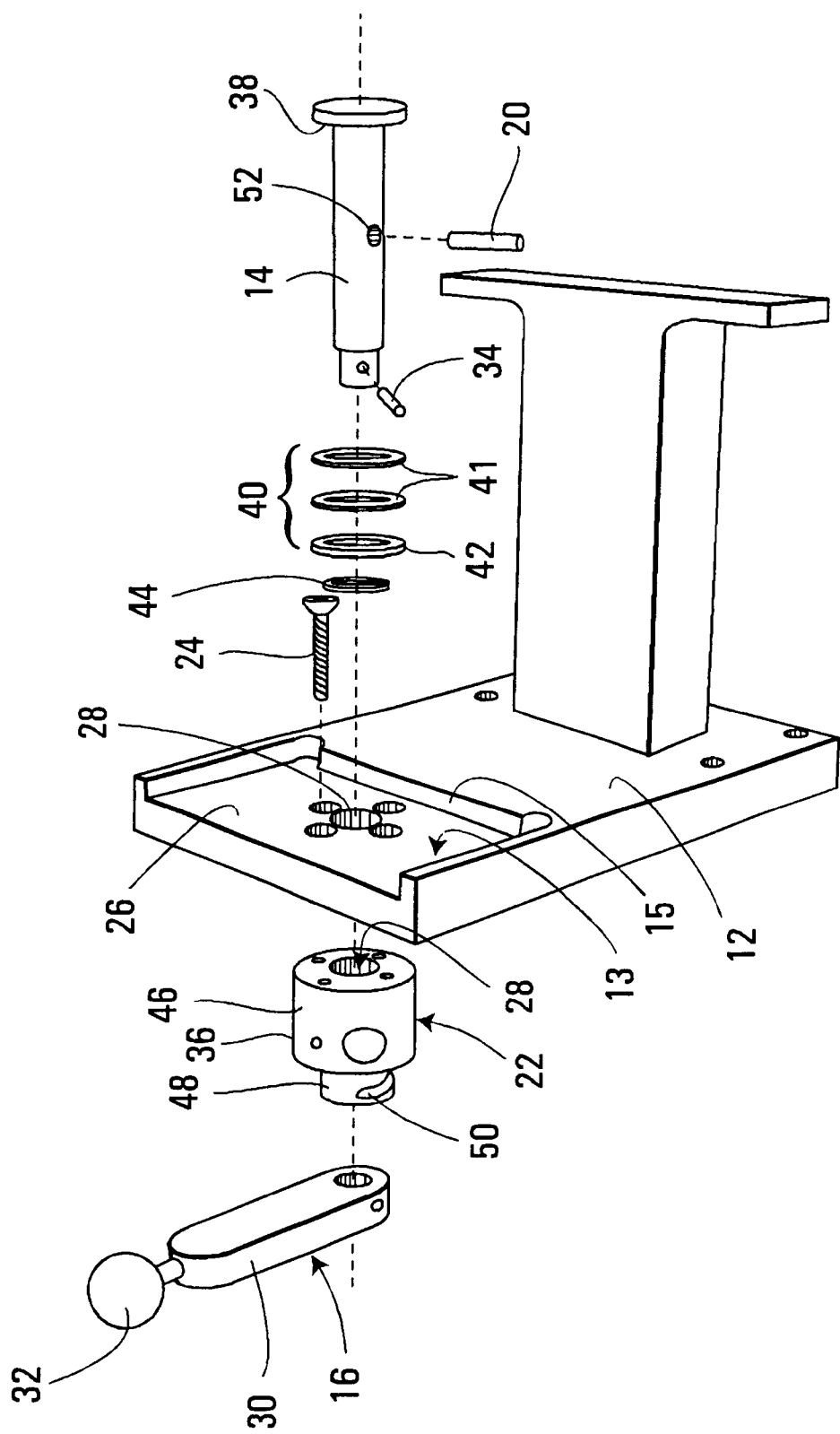
FIG. 3 shows an exploded view of the quick-connect fastener of FIG. 1.

In the specific example of implementation shown in FIGS. 2a and 2b, the locking mechanism 18 is positioned on the same side of base member 12 as hand-operated actuator 16, and comprises two mating parts. The first mating part is a pin 20, and the second mating part is a shaft-receiving member 22. Shaft-receiving member 22 has a longitudinal axis and is attached to base member 12 via a plurality of screws 24. It will be appreciated by a person of skill in the art that shaft-receiving member 22 can be attached to base member 12 using any other means known in the art, or alternatively can be formed integrally with base member 12.

Shaft-receiving member 22 has a peripheral wall 36 with an exterior surface and an interior surface. The interior surface defines a shaft-receiving channel 28 for receiving shaft 14. In the specific embodiment shown, shaft-receiving member 22 is of a cylindrical shape, with a large cylindrical portion 46 and a smaller cylindrical portion 48. In the specific example of implementation shown, large cylindrical portion 46 and smaller cylindrical portion 48 are formed as an integral piece, however, in an alternative embodiment, they can be formed as two separate pieces. Although shaft-receiving member 22 is shown as being of a cylindrical shape, it should be understood that shaft-receiving member 22 may be of any other suitable shape.

Base member 12 also includes a shaft-receiving channel 28 (shown in FIG. 3) such that shaft 14 may extend through both base member 12 and shaft-receiving member 22, and move freely within the shaft-receiving channel 28.

Included in the peripheral wall of shaft-receiving member 22 is at least one slot 50 for receiving pin 20. In the embodiment shown in FIGS. 2a and 2b, shaft-receiving member 22 includes two slots 50, positioned angularly around the smaller cylindrical portion 48, and positioned opposite each other. Slots 50 can extend all the way through the peripheral wall of the shaft-receiving member 22 from the interior surface to the exterior surface, as shown in the Figures, or alternatively, slots 50 may be blind slots that do not extend all the way through peripheral wall 36.

As can be seen in FIG. 3, pin 20 fits within a cross-drilled hole 52 of shaft 14, such that it extends through shaft 14 on both sides. When quick-connect fastener 10 is fully assembled, pin 20 fits within the respective opposing slots 50 of the shaft-receiving member 22 such that it is able to move freely within slots 50. Pin 20 further acts to prevent shaft 14 from sliding out of shaft-receiving channel 28, since when pin 20 is inserted within hole 52 of shaft 14, and slots 50 of the shaft-receiving member 22, shaft 14 is held within shaft-receiving channel 28.

The manner in which shaft 14 and base member 12 move in relation to each other in order to fasten a component between first abutment 26 and second abutment 38, will be described with reference to FIGS. 2a, 2b, 4a, 4b, 4c, 5 and 6.

For the purposes of this description, the term "fasten" means to apply pressure to the component such that it is compressed or clamped between the shaft 14 and the base member 12. Once "fastened" the component is unable to be removed manually from between the shaft 14 and the base member 12. In addition, for the purposes of this invention, "quick-connect fastener" refers to a fastening device that has a predetermined number of operative positions. In a specific example of implementation, the quick-connect fastener has two predetermined operative positions, namely a lock position and a release position. Alternatively, more than two predetermined positions can be provided such as multiple lock positions providing increasing levels of clamping force. In contrast to a bolt and nut arrangement that provides a continuous range of positions, a quick-connect fastener according to the present invention does not provide such a continuous range, but instead provides a finite predetermined number of positions.

In the specific example of implementation shown, base member 12 is a fixed part, and shaft 14 is moveable in relation to base member 12 in response to movement of the hand-operated actuator 16. It should be understood, however, that this relationship may be reversed and shaft 14 may be fixed and base member 12 may be movable.

As explained above, when quick-connect fastener 10 is assembled, pin 20 is adapted to move within slots 50 of shaft-receiving member 22. As such, slots 50 define the range of motion available to shaft 14.

Figure 4A:
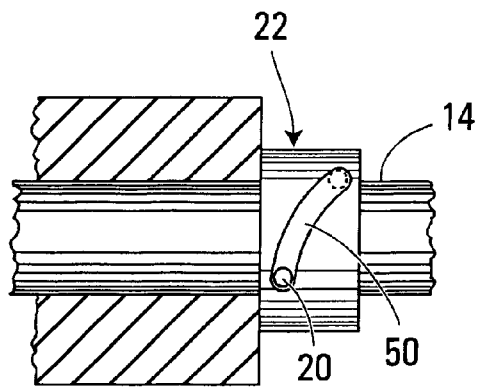
FIG. 4a shows an expanded view of a slot of a locking mechanism in accordance with a first specific embodiment of the invention.

FIG. 4a shows a single slot 50 in accordance with a first embodiment of the invention. Slot 50 has a first end and a second end. The slot extends from the first end to the second end in both an angular direction and a direction along the longitudinal axis of the shaft-receiving member 22. In other words, the slot extends in a coiled, helical manner around at least a portion of the longitudinal axis of the shaft. As such, when pin 20 moves within slot 50, it is forced to move both angularly with relation to shaft-receiving member 22, as well as in a direction along the longitudinal axis of shaft 14. Preferably, as shaft 14 is angularly displaced, the slot forces shaft 14 to move in a direction along its longitudinal axis.

Figure 4B:
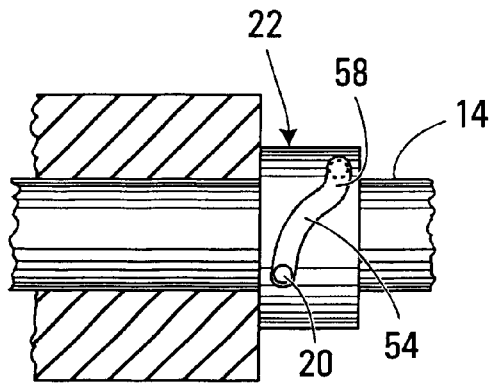
FIG. 4b shows an expanded view of a slot of a locking mechanism in accordance with a second specific embodiment of the invention.

FIG. 4b shows a slot 54 in accordance with a second embodiment of the invention. Slot 54 is similar to slot 50 in that it has a first end and a second end and extends from the first end to the second end in both an angular direction and a direction along the longitudinal axis of the shaft-receiving member 22. However slot 54 further includes an extension 58 that is positioned transversely to the direction of the longitudinal axis of the shaft 14. As such, as pin 20 moves within extension 58, shaft 14 is able to be angularly displaced, but is prevented from being displaced in a direction along its longitudinal axis.

Figure 4C:
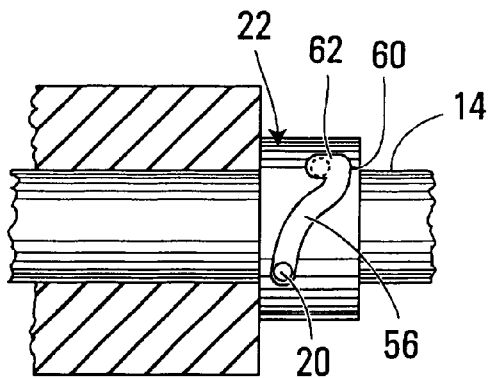
FIG. 4c shows an expanded view of a slot of a locking mechanism in accordance with a third specific embodiment of the invention.

FIG. 4c shows a slot 56 in accordance with a third embodiment of the invention. Slot 56 is also similar to slot 50 for the same reasons as slot 54. However, it further includes both an extension 60 that is positioned transversely to the direction of the longitudinal axis of the shaft 14, and an extension 62 that is positioned parallel to the direction of the longitudinal axis of the shaft 14. As pin 20 moves within extension 60, shaft 14 is able to move in a direction along its longitudinal axis, but is prevented from moving angularly.

For clarity, FIGS. 4a through 4c show pins 20 within slots 50, 54 and 56 in both the lock position and the release position. Pins 20 shown in the release position are illustrated by solid lines, and pins 20 shown in the lock position are illustrated by dotted lines. The first and second ends of the slots 50, 54 and 56 help to provide the user with positive feedback as to when the lock position or the release position has been reached. More specifically, when the user has displaced the shaft 14 such that pin 20 is positioned at the first end of the slot, the user will know that the quick-connect fastener 10 is in the release position. And, when the user has displaced the shaft 14 such that pin 20 is positioned at the second end of the slot, the user will know that the quick-connect fastener 10 is in the lock position. Furthermore, when pin 20 is in the second end indicating that the quick-connect fastener is in the lock position, a specific amount of force will be applied to the fastened component that will be the same whenever the quick-connect fastener is in the lock position.

It will be appreciated that extension 58 of slot 54, and extensions 60 and 62 of slot 56 provide the advantage of helping to maintain pin 20 within the lock position.

Referring back to FIG. 2a, quick-connect fastener 10 is shown in the release position. When pin 20 (not shown in FIG. 2a) is positioned in the release position within slots 50, there is a spacing "X" between first abutment 26 and second abutment 38. As hand-operated actuator 16 is rotated, pin 20 moves angularly from the release position towards the lock position, thereby causing shaft 14 to move along its longitudinal axis in a direction that causes the second abutment 38 to move towards the first abutment 26. As such, when pin 20 is in the lock position, as shown in FIG. 2b, there is a spacing "Y" between first abutment 26 and second abutment 38 that is less than spacing "X".

Figure 5:
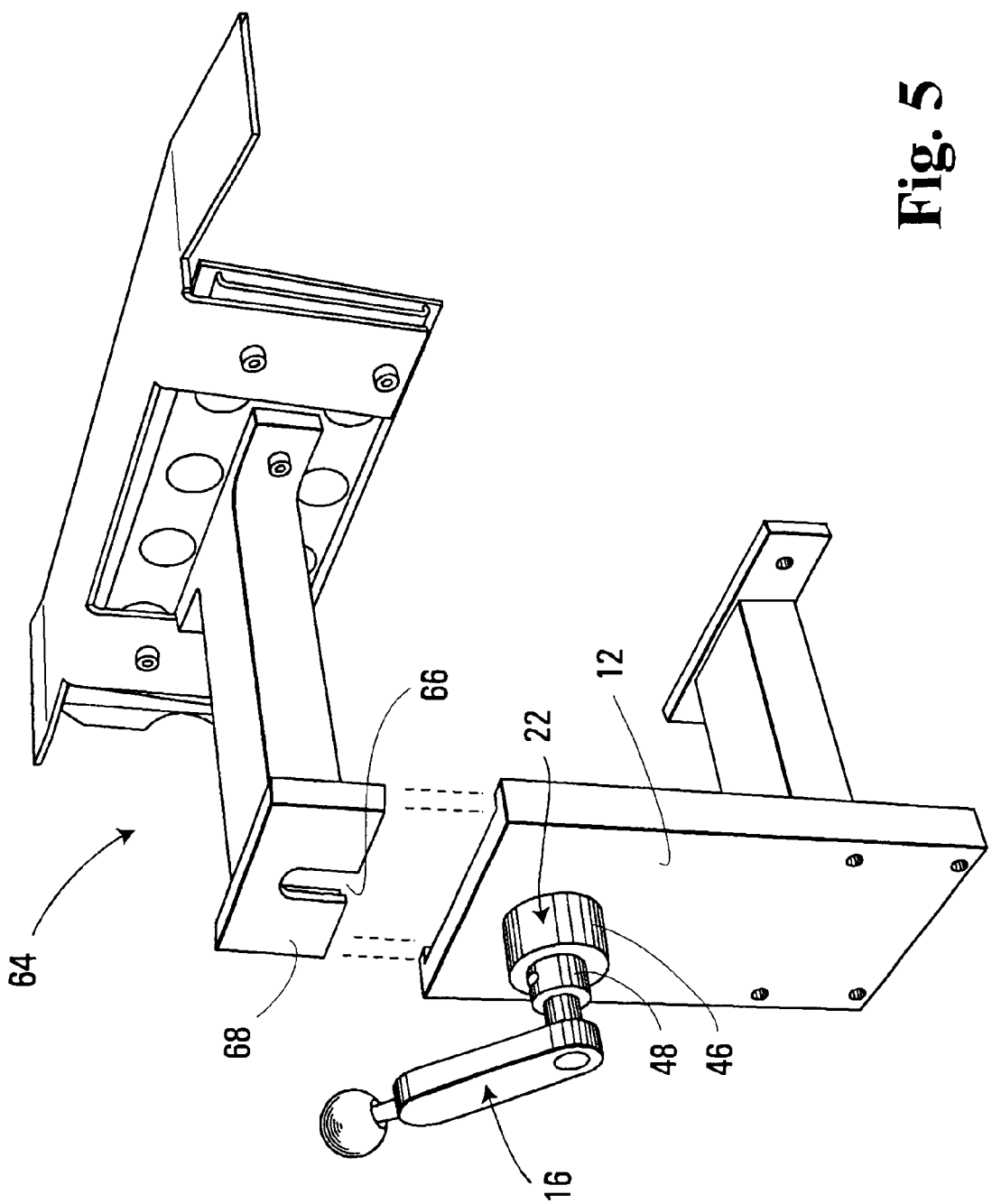
FIG. 5 shows a back perspective view of the fastener of FIG. 1 with a component that is to be fastened.
Figure 6:
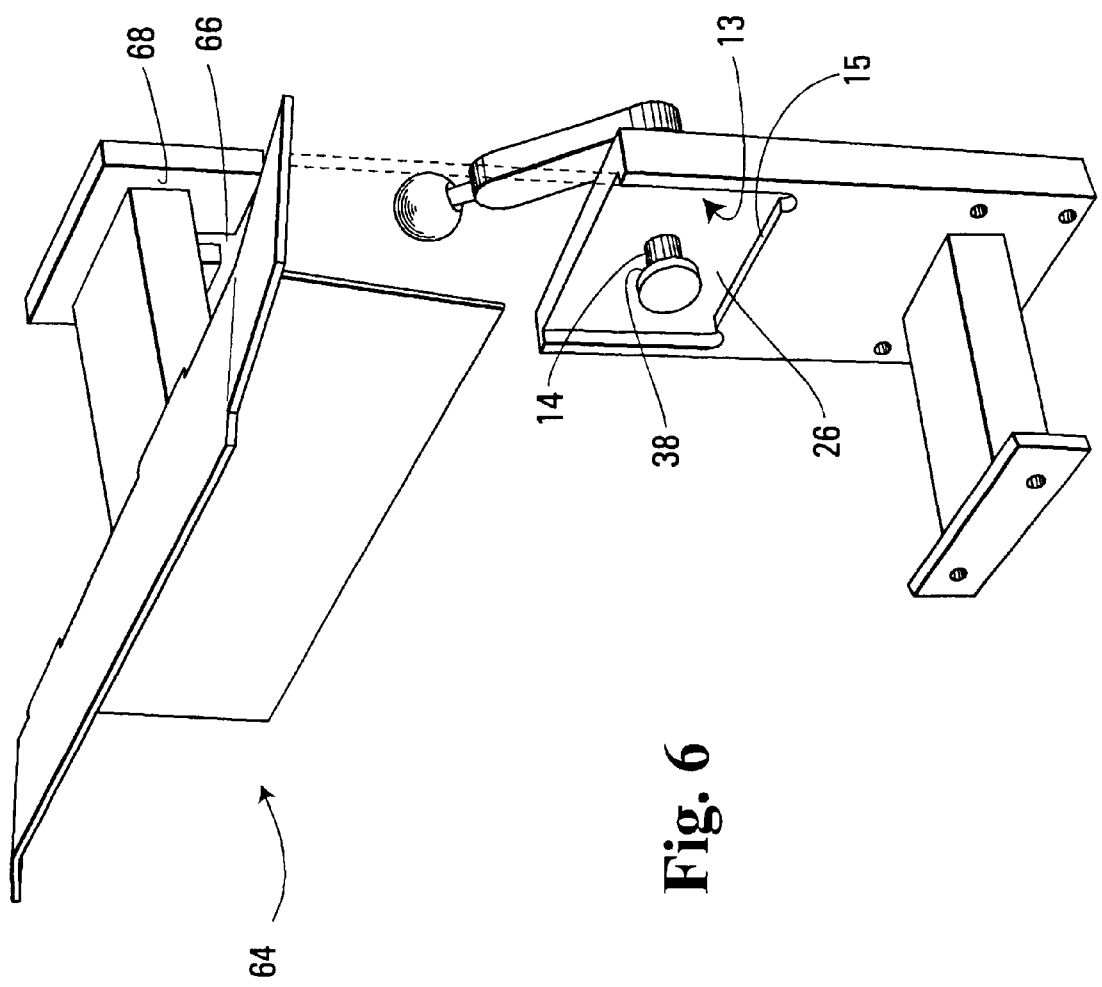
FIG. 6 shows a front perspective view of the fastener of FIG. 1 with a component that is to be fastened.

Shown in FIGS. 5 and 6 is the quick-connect fastener with a component 64 that is to be fastened to base member 12. In the non-limiting example of implementation shown, component 64 is a portion of a cassette that is used in bagging machines. More specifically, the component is used in bagging machine for packaging sanitary napkins within a bag.

Component 64 includes a plate 68 with an attachment slot 66 formed therein. Plate 68 is adapted to slide within recessed area 13 such that attachment slot 66 is positioned over shaft 14 and the component is positioned between first abutment 26 and second abutment 38.

Referring to FIG. 6, the process for securing component 64 to base member 12 will be described. Firstly, a user must ensure that pin 20 is in the release position such that there is a large enough spacing between the first abutment 26 and the second abutment 38 to receive the plate 68 of component 64. If the spacing between the two abutments 26 and 38 is not large enough, the user must simply move hand-operated actuator 16 such that pin 20 moves into the release position. Secondly, the user must slide the plate 68 within recessed area 13 such that attachment slot 66 fits over shaft 14 of the quick-connect fastener. Recessed area 13, and stop 15, act as a guide which plate 66 of component 64 can engage in order to position plate 68 between first abutment 26 and second abutment 38. Furthermore, recessed area 13 helps to prevent plate 68 from rotating about the longitudinal axis of shaft 14 prior to being fastened, and stop 15 helps to keep plate 68 in place. Finally, the user moves hand-operated actuator 16 such that shaft 14 rotates about its longitudinal axis and pin 20 moves into the lock position.

As hand-operated actuator 16 is being moved and pin 20 moves angularly into the lock position, shaft 14 moves along its longitudinal axis in a direction that causes the second abutment 38 to move towards the first abutment 26, thereby fastening plate 68 between the first abutment 26 and the second abutment 38.

In the specific example of implementation shown, as second abutment 38 moves towards first abutment 26, the resilient element 40 (shown in FIG. 3) comes into contact with plate 68 of component 64, and begins to compress. The compression of resilient element 40 helps to securely fasten component 64 to base member 12.

It should be noticed that the quick-connect fastener 10 of the present invention provides the advantage that once pin 20 has been moved into the locked position, quick-connect fastener 10 applies the same amount of force to component 64 regardless of the strength of the person who fastened it.

Although not shown in the figures, it should be understood that in an alternate example of implementation, base member 12 could include a second wall or plate that has a surface that directly faces the plate through which shaft 14 extends, positioned on the opposite side of second abutment 38. In such a case, the second wall or plate could define the first abutment.

Although various embodiments have been illustrated, this was for the purpose of describing, but not limiting, the invention. Various modifications will become apparent to those skilled in the art and are within the scope of this invention, which is defined more particularly by the attached claims.

What is claimed is:

1. A quick-connect fastener for removably fastening a component, said quick-connect fastener comprising:

a) a base member;
   b) a shaft extending through said base member said shaft having a longitudinal axis, said shaft and said base member being displaceable with relation to each other from a first position to a second position, wherein:

i) in said first position said shaft and said base member are positioned relative to each other to cause fastening of the component;
  ii) in said second position said shaft and said base member are positioned relative to each other to allow removal of the component;
c) locking mechanism including first and second mating parts, one of said mating parts being mounted to said shaft, the other of said mating parts being mounted to said base member, said first mating part being movable both angularly and in a direction along said longitudinal axis of said shaft with relation to said second mating part between a lock position, wherein said shaft and said base member are in said first position, and a release position, wherein said shaft and said base member are in said second position, said locking mechanism being responsive to said movement of said first mating part with relation to said second mating part between said lock position and said release position to cause a relative movement between said shaft and said base member along said longitudinal axis to vary a spacing between said shaft and said base member.

2. A quick-connect fastener as defined in claim 1, wherein said base member defines a first abutment and said shaft includes a second abutment, in said first position, the component is fastened between said first and second abutments.

3. A quick-connect fastener as defined in claim 1, comprising an actuator connected to said shaft, said actuator being adapted to displace said first mating part with relation to said second mating part.

4. A quick-connect fastener as defined in claim 3, wherein said actuator is hand-operated for manually displacing said first mating part with relation to said second mating part.

5. A quick-connect fastener as defined in claim 1, wherein said first mating part includes a pin mounted to said shaft.

6. A quick-connect fastener as defined in claim 1, wherein said second mating part is a shaft-receiving member, said shaft receiving member having a longitudinal axis and a peripheral wall with an exterior surface and an interior surface that defines a shaft-receiving channel for receiving said shaft.

7. A quick-connect fastener as defined in claim 6, wherein said peripheral wall includes a slot for receiving said pin, said pin being movable within said slot between said lock position and said release position such that when said pin is in said lock position there is a first spacing between said first abutment and said second abutment, and when said pin is in said release position there is a second spacing between said first abutment and said second abutment, said first spacing being less than said second spacing.

8. A quick-connect fastener as defined in claim 7, wherein said slot extends angularly around a portion of said peripheral wall of said shaft-receiving member.

9. A quick-connect fastener as defined in claim 7, wherein at least a portion of said slot includes a first end and a second end, said portion of said slot extending from said first end to said second end in an angular direction and in a direction along the longitudinal axis of said shaft-receiving member.

10. A quick-connect fastener as defined in claim 9, wherein said first end defines a first stop against which said pin abuts when said shaft and said base member are in said first position.

11. A quick-connect fastener as defined in claim 9, wherein said second end defines a second stop against which said pin abuts when said shaft and said base member are in said second position.

12. A quick-connect fastener as defined in claim 7, wherein said slot includes a region that permits said shaft to move angularly and prevents said shaft from moving in a direction along said longitudinal axis of said shaft.

13. A quick connect fastener as defined in claim 7, wherein said slot includes a region that permits said shaft to move in a direction along said longitudinal axis of said shaft and prevents said shaft from moving angularly.

14. A quick-connect fastener as defined in claim 2, said quick-connect fastener comprising a resilient element positioned between said first and second abutments and wherein said resilient element is compressed when said first and second mating parts are in said locked position.

15. A quick-connect fastener as defined in claim 14, wherein said resilient element comprises at least one bevel washer.

16. A quick-connect fastener as defined in claim 14, wherein said resilient member resilient element comprises a combination of two bevel washers and a flat washer.

17. A quick-connect fastener as defined in claim 2, wherein said base member includes a guide which the component engages when positioned between said first and second abutments, said guide preventing the component from pivoting about the longitudinal axis of said shaft.

\* \* \* \* \*